(12) United States Patent
Kanzaki et al.

(10) Patent No.: US 6,472,477 B2
(45) Date of Patent: Oct. 29, 2002

(54) POLYPROPYLENE RESIN COMPOSITION

(75) Inventors: Susumu Kanzaki, Kisarazu (JP); Kenji Atarashi, Tokyo (JP); Mitsuji Tsuji, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/891,248

(22) Filed: Jun. 27, 2001

(65) Prior Publication Data

US 2002/0040105 A1 Apr. 4, 2002

(30) Foreign Application Priority Data

Jun. 30, 2000 (JP) ........................................ 2000-198924

(51) Int. Cl.⁷ ........................ C08L 23/00; C08L 23/04; C08L 23/10; C08L 23/16
(52) U.S. Cl. ...................................................... 525/240
(58) Field of Search ......................................... 525/240

(56) References Cited

U.S. PATENT DOCUMENTS 6,114,460 A * 9/2000 Hirakawa et al. ........... 525/240
6,319,991 B1 * 11/2001 Okayama et al. ........... 524/108

FOREIGN PATENT DOCUMENTS

| EP | 0 661 341 A1 | 7/1995 |
| JP | 07-157626 | 6/1995 |
| JP | 07-157627 | 6/1995 |
| JP | 07-233305 | 9/1995 |
| JP | 07-286075 | 10/1995 |

* cited by examiner

*Primary Examiner*—Nathan M. Nutter
(74) *Attorney, Agent, or Firm*—Sughrue Mion, PLLC

(57) ABSTRACT

A polypropylene resin composition comprising:

95 to 50% by weight of a propylene homopolymer (A) having an intrinsic viscosity $[\eta]^A$ of not more than 1.3 dl/g; and 5 to 50% by weight of a propylene-ethylene block copolymer (B) having a propylene homopolymer portion having an intrinsic viscosity $[\eta]^B_P$ of from 1.4 to 2.0 dl/g, and a propylene-ethylene random copolymer portion having an intrinsic viscosity $[\eta]^B_{EP}$ of from 4.0 to 15 dl/g, the polypropylene resin composition having a melt flow rate of from 5.0 to 150 g/10 min.

10 Claims, No Drawings

POLYPROPYLENE RESIN COMPOSITION

BACKGROUND OF THE INVENTION

1. Field of the Invention

The present invention relates to a polypropylene resin composition comprising a propylene homopolymer, and a propylene-ethylene block copolymer. More particularly, it relates to a polypropylene resin composition excellent in appearance when formed into a molded article because flow marks hardly generate, in other wards, a die swell is high and few fish eyes generate, and to a molded article made of the polypropylene resin composition.

2. Description of Related Arts

Polypropylene resin compositions are materials excellent in rigidity, impact resistance, and the like, and they have been used in wide fields as molded articles such as automobile internal and external trim materials, electrical parts housings, and the like. It is well known that, among these polypropylene resin compositions, a polypropylene resin composition containing propylene-ethylene block copolymers, for example, a polypropylene resin composition containing a propylene-ethylene block copolymer and a propylene homopolymer, or different two kinds of propylene-ethylene block copolymers is preferably used because of its excellent rigidity, impact resistance, and the like.

For example, JP 7-157626A discloses a thermoplastic resin composition containing a propylene-ethylene block copolymer obtained by multistage polymerization and a polyolefin rubber. As the propylene-ethylene block copolymer, there is used a propylene-ethylene block copolymer wherein the ethylene content of a propylene-ethylene random copolymer phase is from 5 to 50% by weight, the intrinsic viscosity of the copolymer phase is from 4.0 to 8.0 dl/g, and the propylene-ethylene block copolymer having an ethylene content of more than 50% by weight to not more than 98% by weight, and an intrinsic viscosity of from not less than 2.0 to less than 4.0 dl/g. Further, it discloses that the thermoplastic resin composition having a extremely large ductility can be obtained.

Further, JP 7-157627A discloses a thermoplastic resin composition containing a propylene-ethylene block copolymer obtained by multistage polymerization and a polyolefin rubber. As the propylene-ethylene block copolymer, there is used a propylene-ethylene block copolymer wherein the intrinsic viscosity of a propylene-ethylene random copolymer phase is from 4.0 to 8.0 dl/g, and the propylene-ethylene block copolymer has an intrinsic viscosity of from not less than 2.0 to less than 4.0 dl/g excluding the propylene-ethylene block copolymer of JP 7-157626A. Further, it also discloses that the thermoplastic resin composition having a extremely large ductility can be obtained.

Moreover, JP 7-233305A discloses a polypropylene resin composition improved in flowability, containing a polypropylene, an inorganic filler, and a metallic soap composed of a fatty acid composed of 15 to 20 carbon atoms and zinc, and having an improved melt index. As the polypropylene, a block copolymer containing a propylene-ethylene copolymer portion having an [η] of 2 to 6 dl/g and that of 7 to 15 dl/g. As the preferred embodiment, it discloses the composition containing at least two kinds of block copolymers. And, it discloses that there can be obtained a polypropylene resin composition having, in practical use, no problem of reduction of impact strength, rigidity, heat resistance, and the like, being suitable for manufacturing a thin-walled molded article because of its improved flowability, and less causing to discolor into yellow or pink due to pelletizing, and to bleed on the surface of a mold and an injection molded article.

Incidentally, in recent years, a propylene-ethylene block copolymer, which is preferably used because of its excellent rigidity, impact resistance, and the like, has become manufactured by a continuous gas phase process whereby the manufacturing step is simple, and manufacturing can be performed at a low cost. However, in general, the propylene-ethylene block copolymer manufactured by the gas phase process has the following problems. That is, if the intrinsic viscosity of the propylene-ethylene random copolymer portion is set high, granular structures generate whereby appearance of a molded article becomes poor.

As a method for solving such a problem of the appearance, for example, in JP 7-286075A discloses a propylene polymer composition which comprises a propylene polymer manufactured by a continuous polymerization method, wherein the propylene polymer has a content of a 23° C. n-decane soluble component of from 0 to less than 15% by weight, the 23° C. n-decane soluble component contains a structural unit derived from ethylene in an amount of from 30 to 60 mol % and has an intrinsic viscosity [η] of from 3 to 7.5 dl/g, and a propylene block copolymer produced by a batch-wise or continuous solvent polymerization method, wherein the propylene block copolymer has a content of a 23° C. n-decane soluble component of from 15 to 40% by weight, the 23° C. n-decane soluble component contains a structural unit derived from ethylene in an amount of from 30 to 60 mol %, and has an intrinsic viscosity [η] of from 5 to 12 dl/g. It also discloses that the propylene polymer composition is obtainable that is excellent in rigidity and impact resistance, and is capable of being formed into a molded article without generating granular structures on its surface.

However, there has been desired a development of a polypropylene resin composition hardly generating flow marks on its surface when formed into a molded article, in other words, being more excellent in appearance than ever, and having no problem in practical use even when it generates granular structures.

SUMMARY OF THE INVENTION

An object of the present invention is to provide a polypropylene resin composition providing a molded article excellent in appearance when formed into a molded article because flow marks hardly generate, in other wards, a die swell is high and few fish eyes generate.

Further, another object of the present invention is to provide a molded article made of the polypropylene resin composition.

In view of the present situation, the present inventors have intensively studied, and as a result, they have found that a polypropylene resin composition obtained by using two kinds of specific propylene-ethylene block copolymers which are mutually different in structure, can solve the foregoing problems. Thus, they have completed the present invention.

That is, the present invention relates to a polypropylene resin composition comprising:

95 to 50% by weight of a propylene homopolymer (A) having an intrinsic viscosity [η]$^A$ of not more than 1.3 dl/g; and 5 to 50% by weight of a propylene-ethylene block copolymer (B) having a propylene homopolymer portion having an intrinsic viscosity $[\eta]^B_P$ of from 1.4 to 2.0 dl/g, and a propylene-ethylene random copolymer portion having an intrinsic viscosity $[\eta]^B_{EP}$ of from 4.0 to 15 dl/g, wherein the polypropylene resin composition has a melt flow rate (MFR) of from 5.0 to 150 g/10 min. and the sum of the (A) and (B) is 100% by weight.

The present invention will be described in detail below.

DETAILED DESCRIPTION OF THE INVENTION

In the present invention, one ore more kinds of propylene homopolymers may be used.

The intrinsic viscosity $[\eta]^A$ of the propylene homopolymer (A) is not more than 1.3 dl/g, preferably 0.7 to 1.3 dl/g. When the intrinsic viscosity $[\eta]^A$ exceeds 1.3 dl/g, the melt flow rate (MFR) of the polyolefin resin composition may be reduced, resulting in a reduction in flowability.

The isotactic pentad fraction of the propylene homopolymer (A), calculated by $^{13}$C-NMR is preferably not less than 0.95, more preferably not less than 0.97 from the viewpoints of rigidity, heat resistance, and the like.

The molecular weight distribution (Q value) of the propylene homopolymer (A) is preferably from 3 to 6 from the viewpoint of the flowability and the balance between impact resistance and rigidity.

The propylene-ethylene block copolymer (B) used in the present invention is a propylene-ethylene block copolymer comprising a propylene homopolymer portion (herein-after, sometimes referred to as "first segment") and a propylene-ethylene random copolymer portion (herein-after, sometimes referred to as "second segment"). The propylene-ethylene block copolymer (B) is obtained by polymerizing propylene in the presence of a stereoregular polymerization catalyst thereby to produce the first segment, and subsequently copolymerizing ethylene and propylene to produce the second segment.

The intrinsic viscosity $[\eta]^B_P$ of the propylene homopolymer portion as the first segment is preferably not more than 1.4 to 2.0 dl/g, more preferably not more than 1.5 to 1.9 dl/g from the viewpoints of the MFR and flowability of the polypropylene resin composition. When the intrinsic viscosity $[\eta]^B_P$ is less than 1.4 dl/g, a large number of granular structures may occur. When it exceeds 2.0 dl/g, the MFR of the polypropylene resin composition may decrease, resulting in a reduction in flowability.

The aforementioned granular structure is an agglomerate product mainly composed of a propylene-ethylene random copolymer component occurring due to the low dispersibility of the propylene-ethylene random copolymer portion of the polypropylene resin (B), and it has a size of from about 100 to several hundred micrometers. When a molded product is formed with injection molding, or the like, by using a material in which a large number of granular structures are present, not only the appearance of the molded product surface is damaged, but also the mechanical properties such as the impact resistance performance are adversely affected.

The isotactic pentad fraction of the propylene homopolymer portion which is the first segment of the copolymer (B), calculated by $^{13}$C-NMR is preferably not less than 0.95, and more preferably not less than 0.97 from the viewpoints of rigidity, heat resistance, and the like.

The intrinsic viscosity $[\eta]^B_{EP}$ of the propylene-ethylene random copolymer portion which is the second segment of the copolymer (B) is from 4 to 15 dl/g, and preferably from 4.0 to 8.0 dl/g. When the $[\eta]^B_{EP}$ is less than 4.0 dl/g, the die swell is insufficient, so that the flow marks may be unsatisfactory. Whereas, if it exceeds 15.0 dl/g, a large number of granular structures may occur, or the MFR of the polypropylene resin composition may be reduced, resulting in a reduced flowability.

The ethylene content $[(C2')_{EP}]$ of the propylene-ethylene random copolymer portion as the second segment is preferably from 20 to 60% by weight, more preferably from 23 to 50% by weight from the viewpoint of impact resistance.

The manufacturing method of the propylene homopolymer (A), and the propylene-ethylene block copolymer (B) used in the present invention has no particular restriction. However, they can be preferably produced by a known polymerization method with a catalyst system formed from (a) a solid catalyst component containing magnesium, titanium, halogen and an electron donor as essential components, (b) an organoaluminum compound, and (c) an electron donor component, for example, a catalyst system described in U.S. Pat. Nos. 4,983,561, 5,608,018 or 6,187,883, or the like, adjusting polymerization conditions so that the resin can be produced.

From the industrial and economical viewpoints (viewpoint of simplicity of the steps), the polymerization form is preferably a continuous gas phase polymerization.

The contents of the propylene homopolymer (A) and the propylene-ethylene block copolymer(B) in the polyolefin resin composition is from 95 to 50% by weight and 5 to 50% by weight, preferably from 90 to 60% by weight and 10 to 40% by weight, and more preferably from 85 to 65% by weight and 15 to 35% by weight, respectively, wherein the sum of (A) and (B) is 100% by weight.

When the content of the propylene homopolymer (A) is less than 50% by weight, a large number of granular structures may generate, the MFR of the polypropylene resin composition may decrease, resulting in a reduction in flowability. When it exceeds 95% by weight, the die swell is reduced, so that the flow marks may become likely to occur, or the impact resistance may deteriorate.

The polypropylene resin composition of the present invention comprises the propylene homopolymer (A) and the propylene-ethylene block copolymer (B). The melt flow rate measured at 230° C. under a load of 2.16 kg according to JIS-K-6758 (MFR) of the polypropylene resin composition is from 5.0 to 150 g/10 min, and preferably from 10 to 120 g/10 min. When the melt flow rate (MFR) of the polypropylene resin composition of the present invention is from 5.0 to 150 g/10 min, a large molded article is easy to form. When it is less than 5.0 g/10 min, the moldability may be deteriorated, or flow marks may not be satisfactory. Whereas, when it exceeds 150 g/10 min, the impact resistance may be reduced.

The die swell of the polypropylene resin composition of the present invention is preferably not less than 1.45, more preferably not less than 1.50. When the die swell is less than 1.45, the flow marks of a molded article surface may be unsatisfactory.

As the manufacturing method of the polypropylene resin composition of the present invention, a method using a kneading machine such as a single screw extruder, twin screw extruder, Banbury mixer, hot roll or the like, is listed. For example, methods shown below can be mentioned.

(1) A method in which respective polymer powders of the propylene homopolymer (A) and the propylene-ethylene block copolymer (B) are kneaded by using the aforesaid kneading machine.

(2) A method in which the polymer powder of the propylene homopolymer (A) and the polymer powder of the propylene-ethylene block copolymer (B) are individually kneaded by using a single screw or twin screw extruder to prepare their respective pellets, and thereafter, the pellet of the propylene homopolymer (A) and the pellet of the propylene-ethylene block copolymer (B) are kneaded by using a single screw or twin screw extruder.

(3) A method in which the propylene-ethylene block copolymer (B) previously pelletized by using a single screw or twin screw extruder is added to the kneading machine by using a constant amount feeder the process of pelletizing the polymer powder of the propylene homopolymer (A), and the mixture is kneaded.

Preferred is the method using the pellet of the propylene-ethylene block copolymer (B) previously kneaded by using a single screw or twin screw extruder of the aforesaid method (2) or (3).

Further, if required, a screen pack may also be mounted in a die of the single screw or twin screw extruder. As the screen pack to be mounted, preferred is a metal fiber sintered filter, which is, for example, described in "Machine Design (1981, March issue, vol.25, No.3, 109–113)".

The kneading temperature is generally from 170 to 250° C., and preferably from 190 to 230° C.

Various additives may also be added to the polypropylene resin composition of the present invention as far its purpose and effect are not damaged. Examples of the additives include antioxidants, UV absorbers, slipping agents, pigments, antistatic agents, copper harm inhibitors, flame retardants, neutralizing agents, foaming agents, plasticizers, nucleating agents, bubble inhibitors, and crosslinking agents. Among these additives, it is preferable that antioxidants and UV absorbers are added thereto for improving the heat resistance, weather resistance, and antioxidation stability. Further, these additives, rubber components, various inorganic and organic fillers may also added thereto in such a range that the object and effect of the present invention are not damaged.

The additives, rubber components, fillers, and the like may be previously mixed with the polypropylene resin (A), the propylene-ethylene block copolymer (B), or both of them, and thereafter, the polypropylene resin composition is prepared. Alternatively, they may also be mixed therewith in the kneading stage of the polypropylene resin (A) and the propylene-ethylene block copolymer (B).

The polypropylene resin composition of the present invention can be molded into an injection-molded article by a generally known injection molding. Particularly, it is preferably used as an injection-molded article for an automobile, and preferably used as, for example, a door-trim, a pillar, an instrumental panel, a bumper, or the like.

EXAMPLES

The present invention will be described by way of examples below, but is not limited thereto.

The measuring methods of the physical properties of the polymers and compositions used in examples and comparative examples are shown below.

(1) Intrinsic Viscosity (Unit: dl/g)

The reduced viscosities were measured at three concentrations of 0.1, 0.2, and 0.5 g/dl by using an Ubbellohde viscometer. The intrinsic viscosity was determined by a calculation method described in "Polymer Solution, Polymer Experiment, Vol. 11" (published by Kyoritsu Shuppan Co., Ltd, 1982), page 491, i.e. an extrapolation method of plotting the reduced viscosities to the concentrations, then extrapolating the viscosity at a concentration of zero. The measurements were carried out at a temperature of 135° C. by using tetralin as a solvent.

(1-1) Intrinsic Viscosities of Propylene-ethylene Block Copolymers (B)

(1-1a) Intrinsic Viscosity of Propylene Homopolymer Portion ): $[\eta]^B_P$

The intrinsic viscosity $[\eta]^B_P$ of the propylene homopolymer portion which is each first segment of the propylene-ethylene block copolymer (B) was determined in the following manner. That is, at the time of manufacturing thereof, the propylene homopolymer was sampled from a polymerization reactor after the polymerization of the propylene homopolymer, i.e., the first step, and the $[\eta]_P$ of the propylene homopolymer taken out was determined.

(1-1b) Intrinsic Viscosity of Propylene-ethylene Random Copolymer Portion (Secondd Segment): $[\eta]_{EP}$ The intrinsic viscosity $[\eta]^B_{EP}$ of the propylene-ethylene random copolymer portion as the second segment of the propylene-ethylene block copolymer (B) was determined in the following manner. That is, the intrinsic viscosity: $[\eta]^B_P$ of the propylene homopolymer portion, and the intrinsic viscosity: $[\eta]_T$ of the total propylene-ethylene block copolymer were determined, respectively. Then, the intrinsic viscosity $[\eta]_{EP}$ was determined by calculation from the following equation by using the weight ratio: X of the propylene-ethylene random copolymer portion to the total propylene-ethylene block copolymers. (The weight ratio: X based on the total weight of the propylene-ethylene block copolymers was determined from the following measuring method (2)):

$$[\eta]_{EP} = [\beta]_T/X - (1/X-1)[\eta]_P$$

$[\eta]_P$: intrinsic viscosity (dl/g) of propylene homopolymer portion $[\eta]_T$: intrinsic viscosity (dl/g) of total propylene-ethylene block copolymer (1-2) Intrinsic Viscosity of Propylene Homopolymer: $[\eta]_P$ The intrinsic viscosity $[\eta]_P$ of the propylene homopolymer (A) was determined by using a propylene homopolymer in accordance with the aforesaid method (1). (2) Weight ratio of propylene-ethylene random copolymer portion to total propylene-ethylene block copolymers: X, and ethylene content of propylene-ethylene random copolymer portion in propylene-ethylene block copolymer: $(C2')_{EP}$ It was determined from $^{13}$C-NMR spectrum measured under the following conditions based on the report by Kakugo et al., (Macromolecules 1982, 15, 1150–1152).

A sample was prepared by homogeneously dissolving about 200 mg of a propylene-ethylene block copolymer in 3 ml of orthodichlorobenzene in a 10-mm Φ test tube. Then, the $^{13}$C-NMR spectrum was determined under the following conditions:

Measuring temperature: 135° C.

Pulse repeating time: 10 seconds

Pulse width: 45°

Integrating times: 2500

(3) Isotactic Pentad Fraction

The isotactic pentad fraction is a fraction of propylene monomer unit existing at the center of the isotactic chain in the form of a pentad unit, in other words, the chain in which five propylene monomer units are successively meso-bonded, in the polypropylene molecular chain as measured by the method disclosed by A. Zambelli et al. in Macromolecules, 6,925(1973), namely by use of $^{13}$C-NMR. However, the assignment of NMR absorption peak was determined according to the method described in Macromolecules, 8, 687 (1975) published thereafter.

Specifically, the isotactic pentad fraction was measured as an area fraction of mmmm peak in the total absorption peaks in the methyl carbon region of $^{13}$C-NMR spectrum. When the isotactic pentad fraction of NPL standard substance CRM No. M19-14 Polypropylene PP/MWD/2 of NATIONAL PHYSICAL LABORATORY in U.K. was measured by this method, it was 0.944.

(4) Melt Flow Rate (MFR) (Unit: g/10 min.)

It was determined in accordance with the method specified in JIS-K-6758. Unless otherwise stated, the measurement was carried out at a temperature of 230° C. under a load of 2.16 kg.

(5) Die Swell

It was determined by using Capillograph 1B manufactured by Toyo Precision Instrument Co., Ltd., under the following conditions:

Measuring temperature: 220° C.

L/D: 40

Shear rate: $2.432 \times 10^3 \ \text{sec}^{-1}$ (6) Number of Granular Structures (Number Thereof/100 cm$^2$)

The film formed by using a T-die extruder under the following conditions was subjected to quantitative analysis by using an image analysis apparatus in the following manner.

Film forming conditions

A film having a width of 50 mm and a thickness of 50 microns was prepared by means of an extruder V-20 manufactured by Tanabe Plastic Machine Co., Ltd., and a film drawing apparatus.

Quantitative analysis method

The image of the film (900 dpi, 8 bit) was captured in a computer by means of a scanner GT-9600 manufactured by EPSON Co., and the image was subjected to binarization by an image analysis software A-ZOUKUN manufactured by Asahi Engineering Co. The granular structure was recognized as a brighter area than its perimeter. The shape of the granular structure is amorphous, and therefore the number of granular structures having a diameter of not less than 200 microns per 100 cm$^2$ of the film was determined, assuming that the diameter of a circle with the same area as that of the granular structure was the size of the granular structure.

The synthesis methods of two kinds of solid catalyst components I and II used in the examples and comparative examples are shown below.

(1) Solid Catalyst Component I (1-①) Synthesis of Reduced Solid Product

The atmosphere in a 500 ml flask equipped with a stirrer and a dropping funnel was replaced with argon, and then 290 ml of hexane, 9.3 ml (9.3 g, 27 mmol) of tetrabutoxytitanium, 8.5 ml (8.8 g, 32 mmol) of diisobutyl phthalate, and 79.1 ml (74.4 g, 357 mmol) of tetraethoxysilane were charged therein to form a homogeneous solution. Subsequently, while the temperature in the flask was kept at 6° C., 199 ml of a di-n-butyl ether solution of n-butylmagnesium chloride (manufactured by Yukigosei Yakuhin K.K., concentration of n-butylmagnesium chloride: 2.1 mmol/ml) was gradually added dropwise from the dropping funnel over 5 hours.

After completion of the dropwise addition, the solution was stirred at room temperature for an additional one hour. Thereafter, the solution was subjected to solid-liquid separation at room temperature, and washed three times with 300 ml of hexane, and three times with 300 ml of toluene. Then, 270 ml of toluene was added thereto.

A part of the solid product slurry was sampled for composition analysis. As a result, it was indicated that the solid product contained 1.8% by weight of titanium atom, 0.5% by weight of phthalate, 30.7% by weight of ethoxy group and 3.3% by weight of butoxy group. Further, the slurry concentration was 0.140 g/ml.

(1-②) Synthesis of Solid Catalyst Component

The atmosphere in a 200 ml flask equipped with a stirrer, a dropping funnel, and a thermometer was replaced with argon. Then, 84 ml of the solid product-containing slurry obtained in the step (1-①) was charged therein, and further, 12.1 ml of the supernatant was taken therefrom. Then, 7.8 ml (29 mmol) of diisobutyl phthalate was added thereto, and the reaction proceeded at 95° C. for 30 minutes. After the reaction, the reaction product was subjected to solid-liquid separation, and washed twice with 59 ml of toluene.

After completion of washing, 15.3 ml of toluene, 0.66 ml (2.5 mmol) of diisobutyl phthalate, 1.2 ml (6.9 mmol) of butyl ether, and 23.4 (0.213 mole) of titanium tetrachloride were then added in the flask, and the reaction proceeded at 95° C. for 3 hours. After completion of the reaction, the reaction product was subjected to solid-liquid separation at the same temperature, and then washed twice with 59 ml of toluene at the same temperature. Next, 12.0 ml of toluene, 1.2 ml (6.9 mmol) of butyl ether, and 11.7 ml (0.106 mol) of titanium tetrachloride were added thereto, and the reaction proceeded at 95° C. for one hour. After completion of the reaction, the reaction product was subjected to solid-liquid separation at the same temperature, then washed three times with 59 ml of toluene at the same temperature, and another three times with 59 ml of hexane, and dried under reduced pressure to obtain 8.1 g of a solid catalyst component. The resulting solid catalyst component contained 1.4% by weight of titanium atom, 10.0% by weight of phthalate, 0.5% by weight of ethoxy group, and 0.1% by weight of butoxy group. Further, the solid catalyst component was observed with a stereoscopic microscope, and showed favorable particle properties free from fine powder. The solid catalyst component is referred as solid catalyst component I hereinafter.

(2) Solid Catalyst Component II (2-①) Synthesis of Reduced Solid Product

The atmosphere in a 500 ml flask equipped with a stirrer and a dropping funnel was replaced with nitrogen, and then 290 ml of hexane, 8.9 ml (8.9 g, 26.1 mmol) of tetrabutoxytitanium, 3.1 ml (3.3 g, 11.8 mmol) of diisobutyl phthalate, and 87.4 ml (81.6 g, 392 mmol) of tetraethoxysilane were charged therein to form a homogeneous solution. Then, while the temperature in the flask was kept at 6° C., 199 ml of a di-n-butyl ether solution of n-butylmagnesium chloride (manufactured by Yukigosei Yakuhin K.K., concentration of n-butylmagnesium chloride: 2.1 mmol/ml) was gradually added dropwise from the dropping funnel over 5 hours. After completion of the dropwise addition, the solution was further stirred at 6° C. for one hour, and then stirred at room temperature for an additional one hour. Thereafter, the solution was subjected to solid-liquid separation, and washed three times with 260 ml of toluene. Then, an appropriate amount of toluene was added thereto to a slurry concentration of 0.176 g/ml. A part of the solid product slurry was sampled for composition analysis. As a result, it was indicated that the solid product contained 1.96% by weight of titanium atom, 0.12% by weight of phthalate, 37.2% by weight of ethoxy group, and 2.8% by weight of butoxy group.

(2-②) Synthesis of Solid Catalyst Component

The atmosphere in a 100 ml flask equipped with a stirrer, a dropping funnel, and a thermometer was replaced with nitrogen. Then, 52 ml of the solid product-containing slurry obtained in the step (2-②) was charged therein, and 25.5 ml of the supernatant was taken therefrom. Then, a mixture of 0.80 ml (6.45 mmol) of butyl ether and 16.0 ml (0.146 mol) of titanium tetrachloride was added thereto, and then 1.6 ml (11.1 mmol: 0.20 ml/g solid product) was added thereto. The mixture was heated up to 115° C., and stirred for 3 hours as it was. After completion of the reaction, the reaction product was subjected to solid-liquid separation at the same temperature, and washed twice with 40 ml of toluene at the same temperature. Then, a mixture of 10.0 ml of toluene, 0.45 ml (1.68 mmol) of diisobutyl phthalate, 0.80 ml (6.45 mmol) of butyl ether, and 8.0 (0.073 mol) of titanium tetrachloride was added therein for 1-hour treatment at 115° C. After completion of the reaction, the reaction product was subjected to solid-liquid separation at the same temperature, and then washed three times with 40 ml of toluene at the same temperature, and then washed another three times with 40 ml of hexane. Then, the washed product was dried under reduced pressure to obtain 7.36 g of a solid catalyst component. The resulting solid catalyst component contained 2.18% by weight of titanium atom, 11.37% by weight of phthalate, 0.3% by weight of ethoxy group, and 0.1% by weight of butoxy group. Further, the solid catalyst component was observed with a stereoscopic microscope, and showed favorable particle properties free from fine powder. The solid catalyst component is referred as solid catalyst component II hereinafter.

Production of Propylene Homopolymer (A)

Production of Propylene Homopolymer A-1

(1) Preliminary Polymerization

In an autoclave equipped with a stirrer, in sufficiently dehydrated and deaerated hexane, triethylaluminium (below, abbreviated as TEA), cyclohexylethyldimethoxysilane (below, abbreviated as CHEDMS) as an electron donor component, and the solid catalyst component I were charged such that their concentrations were 25 mmol/L, CHEDMS/TEA=0.1 (mol/mol), and an amount of the polymer based on the amount of the final solid catalyst component (below, abbreviated as PP/cat) of 2.5 (g/g), respectively. While maintaining it at low temperatures, propylene was continuously fed therein to obtain a preliminary polymer slurry. The preliminary polymer slurry thus obtained was transferred to an autoclave equipped with a stirrer, and then sufficiently purified liquid butane was added thereto. The mixture was preserved while being kept at a temperature of not more than 10° C.

(2) Main Polymerization

Under such conditions that the concentrations of propylene and hydrogen in the gas phase part were kept at 81% by volume and 7.7% by volume, respectively, at a reactor inner temperature of 90° C. and a reactor inner pressure of 1.8 MPa, continuous gas phase polymerization was carried out while feeding the preliminary polymer slurry prepared in (1) above as a solid catalyst component, TEA and CHEDMS thereto. Respective catalyst components were fed such that the concentrations in the polymers obtained were as follows: [TEA]=299 ppm, [CHEDMS]=52 ppm, and PP/cat=16000 (g/g), respectively. The averagee residence time was 3.3 hr. The analysis results of the polymer obtained are shown in Table 1. The polymer obtained had an intrinsic viscosity $[\eta]^A_P$ of 0.84 dl/g.

Production of A-2

A powder of A-2 having the physical properties shown in Table 1 was obtained in the same manner as with A-1, except that the temperature was changed to 80° C., and the gas composition of the gas phase part and the amount of the catalyst component to be fed were adjusted in the main polymerization. The analysis results of the polymer obtained are shown in Table 1. The polymer obtained had an intrinsic viscosity $[\eta]^A_P$ of 0.90 dl/g, and an isotactic pentad fraction of 0.97.

Production of A-3

A powder of A-2 having the physical properties shown in Table 1 was obtained in the same manner as with A-1, except that the temperature was changed to 80° C., and the gas composition of the gas phase part and the amount of the catalyst component to be fed were adjusted in the main polymerization. The analysis results of the polymer obtained are shown in Table 1. The polymer obtained had an intrinsic viscosity $[\eta]^A_P$ of 0.89 dl/g.

Production of A-4

Preliminary polymerization was carried out in the same manner as with A-1, except that the kind of the solid catalyst component was changed to II, and the electron donative component was changed to tert-butyl-n-propyldimethoxysilane (below, abbreviated as tBnPDMS).

A powder of A-4 having the physical properties shown in Table 1 was obtained in the same manner as with A-1, except that the number of reactors was changed from 1 to 3, the kind of the electron donor component was changed to tBnPDMS, the temperature was set at 82° C., and the gas composition of the gas phase part and the amount of the catalyst component to be fed were adjusted, in the main polymerization. The analysis results of the polymer obtained are shown in Table 1. The polymer obtained had an intrinsic viscosity $[\eta]^A_P$ of 0.76 dl/g, and an isotactic pentad fraction of 0.99.

Production of A-5

A powder of A-5 having the physical properties shown in Table 1 was obtained in the same manner as with A-1, except that the gas composition of the gas phase part and the amount of the catalyst component to be fed were adjusted in the main polymerization. The analysis results of the polymer obtained are shown in Table 1. The intrinsic viscosity $[\eta]^A_P$ was 1.2 dl/g.

Production of Propylene-ethylene Block Copolymer (B)

Production of B-1

(1) Preliminary Polymerization: It was Performed in the Same Manner as with A-1.

(2) Main Polymerization

Polymerization reactors composed of two polymerization vessels were arranged in series. After polymerization of the propylene homopolymer portion (first segment), the product was transferred to the next polymerization vessel, and subsequently the polymerization of the propylene-ethylene random copolymer portion (second segment) was carried out continuously in the polymerization vessel by a gas phase method.

In the first vessel, under such conditions that the concentrations of propylene and hydrogen in the gas phase part were kept at 93% by volume and 1.0% by volume, respectively, at a reactor inner temperature of 80° C. and a reactor inner pressure of 1.8 MPa, continuous gas phase polymerization was carried out while feeding the preliminary polymer slurry prepared in (1) above as a solid catalyst component, TEA and CHEDMS. Respective catalyst components were fed such that the concentrations in the polymers obtained were as follows: [TEA]=373 ppm, [CHEDMS]=66 ppm, and PP/cat=28000 (g/g), respectively. The average residence time was 4.2 hr. The polymer obtained had an intrinsic viscosity $[\eta]^B_P$ of 1.5 dl/g.

In the second vessel, under such conditions that the concentrations of propylene, ethylene, and hydrogen in the gas phase part were kept at 88.4% by volume, 11.0% by volume, and 0.1% by volume, respectively, at a reactor inner temperature of 65° C. and a reactor inner pressure of 1.4 MPa, a gas phase polymerization was carried out continuously. Respective catalyst components were fed such that the concentrations in the polymers obtained were as follows: [TEA]=270 ppm, [CHEDMS]=48 ppm, and PP/cat=11000 (g/g), respectively. The average residence time was 3.0 hr. The analysis results of the polymer obtained are shown in Table 1. The total polymers obtained had an intrinsic viscosity $[\eta]^B_T$ of 2.43 dl/g, and an EP content of 28% by weight, and the ethylene content of EP was 24% by weight. Therefore, the intrinsic viscosity $[\eta]_{EP}$ of the EP portion was 4.9 dl/g.

Production of B-2

A powder of B-2 having the physical properties shown in Table 1 were obtained in the same manner as with B-1, except that the gas composition of the gas phase part and the amount of the catalyst component to be fed were adjusted in the main polymerization.

Production of B-3

A powder of B-3 having the physical properties shown in Table 1 were obtained in the same manner as with B-1, except that the gas composition of the gas phase part and the amount of the catalyst component to be fed were adjusted in the main polymerization.

Production of B-4

A powder of B-4 having the physical properties shown in Table 1 were obtained in the same manner as with B-1, except that the gas composition of the gas phase part and the amount of the catalyst component to be fed were adjusted in the main polymerization.

Production of B-5

Preliminary polymerization was carried out in the same manner as with A-1, except that the kind of the solid catalyst component was changed to II, and the amounts of the catalyst components to be fed were changed.

A powder of B-5 having the physical properties shown in Table 1 was obtained in the same manner as with B-1, except that the number of reactors was changed from 2 to 3, the gas composition of the gas phase part and the amount of the catalyst component to be fed were adjusted, in the main polymerization.

Production of B-6

A powder of B-6 having the physical properties shown in Table 1 was obtained in the same manner as with B-1, except that the number of reactors was changed from 2 to 3, the gas composition of the gas phase part and the amount of the catalyst component to be fed were adjusted, in the main polymerization.

The $[\eta]_P$, $[\eta]_{EP}$, and the ethylene content of EP, and the EP content are the analysis values of the powders of the propylene homopolymers (A-1 to A-5) and the propylene-ethylene block copolymers (B-1 to B-6) obtained from the above-described polymerization. Each the MFR is a MFR of pellets granulated by adding, as stabilizers, 0.05 parts by weight of calcium stearate (manufactured by NOF Corp.), 0.05 parts by weight of 3,9-bis[2-{3-(3-t-butyl-4-hydroxy-5-methylphenyl)propionyloxy}-1,1-diemthylethyl]-2,4,8,10-tetraoxaspiro[5.5]undecane (Sumilizer GA80, manufactured by Sumitomo Chemical Co., Ltd.), and 0.05 parts by weight of bis(2,4-di-t-butylphenyl)pentaerythritol diphosphite (Ultranox U626, manufactured by GE Specialty Chemicals., Co.) to every 100 parts by weight of the powder by using a 40-mm Φ single screw extruder (220° C., screen pack: 100 mesh). Whereas, the number of granular structures (>200 μm) is a number of granular structures having a size of not less than 200 μm, observed per 100 cm² of a film obtained by processing the pellets by using a 20-mm Φ T-die extruder.

EXAMPLE-1

70 parts by weight of the propylene homopolymer powder (A-1), 30 parts by weight of the propylene-ethylene block copolymer pellets (B-1), as stabilizers, 0.05 parts by weight of calcium stearate (manufactured by NOF Corp.), 0.05 parts by weight of 3,9-bis[2-{3-(3-t-butyl-4-hydroxy-5-methylphenyl)propionyloxy}-1,1-diemthylethyl]-2,4,8,10-tet raoxaspiro[5.5]undecane (Sumilizer GA80, manufactured by Sumitomo Chemical Co., Ltd.), and 0.05 parts by weight of bis(2,4-di-t-butylphenyl)pentaetythritol diphosphite (Ultranox U626, manufactured by GE Specialty Chemicals., Co.), were dry-blended. Then, the resulting mixture was palletized with a 40-mm Φ single screw extruder (220° C.,screen pack: metal fiber sintered filter NF13D manufactured by Nippon Seisen K.K.) to obtain a polypropylene resin composition. The MFR was 36 g/10 min, the processed film had less granular structures, and the die swell determined at 220° C., an L/D of orifice of 40, and a shear rate of $2.432 \times 10^3$ $sec^{-1}$ was high as 1.81.

EXAMPLES 2 to 4

Table 2 shows the mixing ratios of respective components, and the evaluation results of MFR, die swell, and number of granular structures having a size of not less than 200 μm, observed per 100 cm² of film of each polypropylene resin composition obtained by conducting dry-blending and then pelletization in the same manner as in Example 1.

Comparative Examples 1 to 5

Table 3 shows the mixing ratios of respective components, and the evaluation results of MFR, die swell, and number of granular structures having a size of not less than 200 μm, observed per 100 cm² of film of each polypropylene resin composition obtained by conducting dry-blending and then pelletization in the same manner as in Example 1.

It has been found that, for Comparative Examples 1 to 3, since the intrinsic viscosity $[\eta]^B_P$ of the P portion and the intrinsic viscosity $[\eta]^B_{EP}$ of the EP portion of the propylene-ethylene block copolymer (B) do not satisfy the requirements of the present invention, the die swell is insufficient; for Comparative Example 4, since the intrinsic viscosity $[\eta]^B_P$ of the P portion of the propylene-ethylene block copolymer (B) does not satisfy the requirements of the present invention, the number of granular structures is large; and for Comparative Example 5, since the mixing ratios of the propylene homopolymer (A) and the propylene-ethylene block copolymer (B) do not satisfy the requirements of the present invention, the number of granular structures is large.

TABLE 1

Analysis results

|  |  | $[\eta]_P$ dl/g | $[\eta]_{EP}$ dl/g | Ethylene content of EP wt % | EP content wt % | MFR g/10 min | Number of granular structure (>200 μm) Number/10 cm² |
|---|---|---|---|---|---|---|---|
| Propylene polymer [A] | A-1 | 0.84 | — | — | — | 182 | — |
|  | A-2 | 0.90 | — | — | — | 140 | — |
|  | A-3 | 0.89 | — | — | — | 152 | — |
|  | A-4 | 0.76 | — | — | — | 330 | — |
|  | A-5 | 1.2 | — | — | — | 30 | — |
| Ethylene- | B-1 | 1.5 | 4.9 | 24 | 28 | 2.1 | 52 |

TABLE 1-continued

Analysis results

| | | $[\eta]_P$ dl/g | $[\eta]_{EP}$ dl/g | Ethylene content of EP wt % | EP con-t ent wt % | MFR g/10 min | Number of granular structure (>200 μm) Number/10 cm² |
|---|---|---|---|---|---|---|---|
| propylene block copolymer [B] | B-2 | 1.5 | 4.7 | 36 | 39 | 2.1 | 188 |
| | B-3 | 1.6 | 5.0 | 30 | 57 | 0.5 | 91 |
| | B-4 | 1.0 | 6.1 | 49 | 17 | 29 | 239 |
| | B-5 | 1.8 | 4.8 | 29 | 32 | 1.0 | 9 |
| | B-6 | 1.2 | 2.7 | 40 | 33 | 11 | 13 |

TABLE 2

| | Example 1 | Example 2 | Example 3 | Example 4 |
|---|---|---|---|---|
| Mixing ratio (wt %) | | | | |
| Propylene polymer [A] | | | | |
| A-1 | 70 | | | |
| A-2 | | 70 | | |
| A-3 | | | 23 | |
| A-4 | | | 50 | |
| A-5 | | 7 | | 81 |
| Ethylene-propylene block copolymer [B] | | | | |
| B-1 | 30 | | | |
| B-2 | | 23 | | |
| B-3 | | | | 19 |
| B-5 | | | 27 | |
| MFR g/10 mm | 36 | 45 | 49 | 14 |
| Die swell | 1.80 | 1.57 | 1.59 | 1.54 |
| Number of granular structures (>200 μm) | | | | |
| Number thereof/ 10 cm² | 0 | 7 | 6 | 9 |

TABLE 3

| | Comparative Example 1 | Comparative Example 2 | Comparative example 3 | Comparative example 4 | Comparative example 5 |
|---|---|---|---|---|---|
| Mixing ratio (wt %) | | | | | |
| Propylene polymer [A] | | | | | |
| A-1 | | | | | 40 |
| A-2 | | 50 | 33 | | |
| A-3 | 73 | | | | |
| A-4 | | 73 | | | |
| A-5 | | | | 17 | |
| Ethylene-propylene block copolymer [B] | | | | | |
| B-2 | | | | | 60 |
| B-4 | | | 50 | | |
| B-6 | 27 | 27 | | 50 | |
| MFR g/10 min | 73 | 126 | 40 | 46 | 16 |
| Die swell | 1.42 | 1.39 | 1.39 | 1.48 | — |
| Number of granular structure (>200 μm) | | | | | |
| Number/10 cm² | 0 | — | 1 | 90 | 71 |

The present invention can provide a polypropylene resin composition excellent in appearance as to be less likely to undergo the occurrence of flow marks, i.e., have a high die swell, and undergo less occurrence of granular structures, when formed into a molded product.

What is claimed is:

1. A polypropylene resin composition comprising:
   95 to 50% by weight of a propylene homopolymer (A) having an intrinsic viscosity $[\eta]^A$ of not more than 1.3 dl/g; and
   5 to 50% by weight of a propylene-ethylene block copolymer (B) having a propylene homopolymer portion having an intrinsic viscosity $[\eta]^B_P$ of from 1.4 to 2.0 dl/g, and a propylene-ethylene random copolymer portion having an intrinsic viscosity $[\eta]^B_{EP}$ of from 4.0 to 15 dl/g, the polypropylene resin composition having a melt flow rate of from 5.0 to 150 g/10 min. and the sum of the (A) and (B) being 100% by weight.

2. The polypropylene resin composition according to claim 1, wherein the intrinsic viscosity $[\eta]^A$ of the propylene homopolymer portion is from 0.7 to 1.3 dl/g.

3. The polypropylene resin composition according to claim 1, wherein the intrinsic viscosity $[\eta]^B_P$ of the propylene-ethylene random copolymer portion is from 1.5 to 1.9 dl/g.

4. The polypropylene resin composition according to claim 1, wherein the intrinsic viscosity $[\eta]^B_{EP}$ of the propylene-ethylene random copolymer portion is from 4.0 to 8.0 dl/g.

5. The polypropylene resin composition according to claim 1, comprising 90 to 60% by weight of the polypropylene propylene homopolymer (A), and 10 to 40% by weight of the propylene-ethylene block copolymer (B).

6. The polypropylene resin composition according to claim 1, wherein the melt flow rate (MFR) of the polypropylene resin composition is from 10 to 120 g/10 min.

7. The polypropylene resin composition according to claim 1, wherein the propylene-ethylene block copolymer (B) is obtained by a gas phase continuous polymerization method.

8. The polypropylene resin composition according to claim 1, wherein the die swell of the polypropylene resin composition is not less than 1.45.

9. The polypropylene resin composition according to claim 1, wherein the die swell of the polypropylene resin composition is not less than 1.50.

10. A molded product comprising the polypropylene resin composition according to claim 1.

* * * * *